March 5, 1946.  C. S. CLARK  2,395,847
PISTON
Filed Nov. 1, 1940
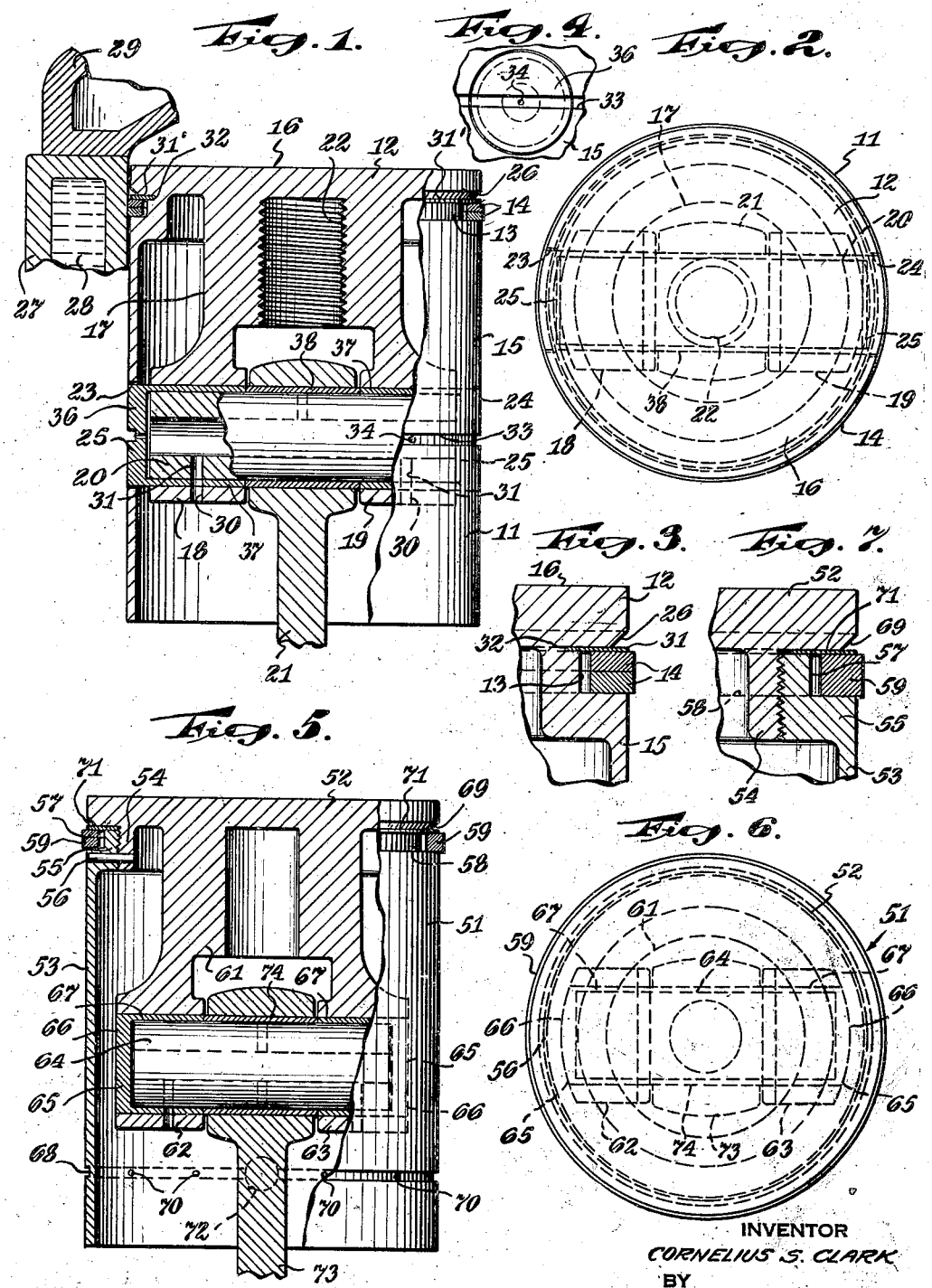
INVENTOR
CORNELIUS S. CLARK
BY Towson Price
ATTORNEY Patented Mar. 5, 1946

2,395,847

UNITED STATES PATENT OFFICE 2,395,847
PISTON

Cornelius S. Clark, Norfolk, Va.

Application November 1, 1940, Serial No. 363,855

5 Claims. (Cl. 309—4)

This invention relates to pistons, and more particularly to such in which the wrist pin bearings extend from the heads, rather than from the skirts, thereof.

The principal object of my invention, generally considered, is to provide a piston of improved design and in which the skirt is relatively free from the wrist pin bearings, whereby it may expand and contract more uniformly than in the conventional construction.

Another object of my invention is to provide a cast piston in which the bearings for the wrist pin, or means for movably securing the connecting rod thereto, extend directly from the head, rather than the skirt, thereof.

A further object of my invention is the provision of a piston with a sealing strip adjacent the outer surface of its head, said strip being either crimped in the groove for receiving piston ring means, so that it preferably defines one side wall of said groove or clamped between the head and skirt portions of said piston, if the latter is formed in two parts.

A still further object of my invention is the provision of a piston having a sealing strip in a groove for receiving piston ring means, that portion of said piston forming the wall of said groove, toward the outer surface of the piston head, being beveled in order to allow pressure from the cylinder and/or combustion chamber to act on said strip and press it against the piston ring, thereby preventing escape of pressure behind the ring.

An additional object of my invention is the provision of a piston, comprising head and skirt portions, said head portion carrying the wrist pin bearings, cored for lightness, and desirably threaded to receive a chuck for holding the piston while the same is being machined.

Other objects and advantages of the invention, relating to the particular arrangement and construction of the various parts, will become apparent as the description proceeds.

Referring to the drawing:

Figure 1 is an axial sectional view of a piston embodying my invention, portions of the associated piston rings, cylinder, cylinder head, wrist pin, and connecting rod being also shown.

Figure 2 is a plan view of the head end of the piston.

Figure 3 is an enlarged, sectional view, corresponding to the upper right hand corner of the piston section shown in Figure 1.

Figure 4 is an elevational view of one of the thimble bushings which serve as wrist pin retainers.

Figures 5, 6 and 7 are views corresponding, respectively, to Figures 1, 2 and 3, but showing another embodiment of my invention.

One of the major problems met in the construction of pistons for internal combustion engines, has been the unevenness of the expansion of the piston due to variation in the thickness of sections. Some of this variation is occasioned by the fact that, in the present designs of such pistons, the wrist pin bearings are cast into and made integral with the piston skirt. The incorporation of such masses of metal has meant that heat is transferred to and from the thinner sections more rapidly than to and from the heavier sections, with a consequent warping of the structure.

In accordance with my improved design, as illustrated in detail in the drawing, I have succeeded in eliminating this cause of uneven expansion and contraction by avoiding any direct connection between the wrist pin bearings and the skirt, and instead carrying said bearings directly from the head of the piston.

In the drawing, the reference character 11 designates a piston, embodying my invention, comprising a relatively thick cylindrical head portion 12, formed with a single peripheral groove 13 for receiving piston ring means, which may be one or two rings 14. Although this is all that is needed in this type of piston to insure tightness, it will be understood that more grooves and rings may be used, if desired, as with conventional pistons. A skirt portion 15 extends from the peripheral portion of the head 12 at the side of the grooved portion opposite to the outer or upper surface 16 of the head portion.

From the inner central part of the head portion 12 extends a preferably uniformly cylindrical column 17, desirably coaxial with the outer surface of the piston, terminating in hollow enlargements 18 and 19, providing bearings for the wrist pin 20, which serves for movably securing the associated connecting rod 21 thereto. The column 17 is desirably cored or bored hollow for lightness and threaded, as indicated at 22 for connection with a chuck for holding it while being machined.

In order to provide for entry of the wrist pin 20, the skirt portion 15, which is thin and otherwise continuous and uniform in thickness, is apertured, as indicated at 23 and 24. However, one or both of these apertures may, if desired, be subsequently closed by thimble bushings 25 held in place in any desired manner, as by being tightly fitted in the associated bearings 18 and 19. The outer surface of the skirt portion 15 desirably has an oil groove 33 formed therein, which groove, in the present embodiment, merges with the apertures 23 and 24. It may, if desired, be provided with holes 34 communicating with the inner surface of the skirt 15 and be continued on the thimble bushings 25.

Each thimble bushing 25 comprises a cylindrical head portion 36, and a skirt or bushing proper portion 37, which preferably tightly fits its associated bearing so that it is held in place. The head portion 36 may have an outer cylindrical surface corresponding with the outer surface of the skirt portion 15. One of said thimble bushings may be applied with the pin and the other inserted thereafter through hole 23 or 24 in the skirt, which is slightly larger than said bushing. They serve to retain the pin in place while allowing a turning movement thereof. In other words, the bushings 25 act as thrust blocks at the ends of the wrist pin 20, thereby avoiding the necessity of the usual retaining means for such wrist pin and allowing, not only rotation between the connecting rod and pin, but also between the pin and bearings. Conventional cotter pins may be used instead.

It will, therefore, be seen that I have provided thimble bushings 25 for the end portions of the wrist pin 20, which also function as wrist pin retainers. A plain cylindrical bushing 38 may be placed between the wrist pin 20 and the connecting rod 21. When the piston is assembled with the cylinder, it is impossible for these bushings to drop out because even if they became loose in the bearings 18 and 19, they would be held on one side by the cylinder wall and on the other by the adjacent end of the wrist pin.

In order to provide for proper lubrication, oil holes 30 are desirably provided in the bearings 18 and 19, and corresponding oil holes 31 in the pin which is desirably hollow, as illustrated most clearly in Figure 1.

Although these bushings 25 are desirably made of the same material as the piston skirt, yet they may, if desired, be advantageously made of copper, brass, or material softer than cast iron or steel, thereby avoiding the possibility of scoring the cylinder wall in case they tend to project beyond the outer surface of the skirt.

It will, therefore, be seen that in the construction disclosed in Figures 1, 2 and 3, the wrist pin may have three independent relative motions; one rotational with respect to the connecting rod; one rotational with respect to the wrist pin bearings; and one axial with respect to said bearings and assembled rod. Such freedom to move avoids concentration of wear on the connecting-rod-wrist-pin areas, thereby increasing the life of the combination and minimizing repairs.

The outer part of the head portion 12 is desirably beveled, as indicated at 26, to allow fluid from the outer portion of the cylinder 27, desirably hollow to receive cooling water 28, adjacent the cylinder head 29, to press a flat flexible sealing ring or annular member 31', preferably about .01 inch thick and made of alloy steel, stainless steel, copper, brass, or the like, into tight sealing engagement with the ring means 14. The ring is placed, and desirably crimped or otherwise tightly gripped in a thin groove 32 formed in the outer part of the head portion defining the groove 13, in any desired manner, as after being cut at one place to allow for entry, by being spiraled into the groove, and the ends then secured together, as by silver solder. This tight sealing engagement is maintained as the parts wear, because the metal sealing member 31' is by virtue of its construction so flexible that, when subjected to fluid pressure during operation, flexure takes place between the gripped and outer portions and the latter portion engages the adjacent surface of the piston ring over a substantial area.

Referring now to the embodiment of my invention illustrated in Figures 5, 6 and 7, the reference character 51 designates a piston, comprising another embodiment of my invention. In the present instance, the relatively thick circular head portion 52 of said piston is desirably made of some light material, such as aluminum, magnesium, or light alloy, formed separate from the skirt portion 53, which is desirably made of more durable material of lower expansivity, such as cast iron or steel, and connected thereto as by means of a threaded annular boss 54 on the head portion 52, of a diameter smaller than the overall head diameter, and a thickened and offset threaded end portion 55 on the skirt portion 53. The threaded connection has sufficient "give" to allow for the slight unequality in expansion characteristics. The parts are prevented from disconnection after tight engagement in any conventional manner, as by means of a locking pin, screw or cotter member 56.

The assembled head and skirt portions, by virtue of the offset forming an end notch 57 in the threaded part of the skirt portion 53, provide a single peripheral groove 58 for receiving piston ring means, shown in the present embodiment, as a single ring 59. Although this is all that is needed to insure tightness, in the type of piston disclosed, it will be understood that more grooves and rings may be used as with conventional pistons, or as in the preceding embodiment.

From the inner central portion of the head member 52 extends a preferably uniformly cylindrical column 61, desirably coaxial with the outer or peripheral surface of the head member 52, and its assembled skirt member 53. Said column terminates in hollow enlargements 62 and 63, providing bearings for a wrist pin 64, which may be retained by thimble bushings 65 as in the preceding embodiment.

The bushings 65 may each have a cylindrical end surface 66, and a skirt or bushing proper 67, as in the preceding embodiment, except that the bushings do not project into the skirt 53, but are enclosed thereby. They are held in place in any desired manner, or as in the preceding embodiment, by tightly fitting the bearings 62 and 63. Conventional cotter pins or other pin-retaining means may be employed, if desired, as the associated connecting rod 73 may be assembled with the head portion prior to connection of the skirt member 53 therewith, thereby avoiding the necessity for any wrist pin receiving holes in the skirt portion, or anything unconventional in connection with the assembly of the wrist pin, connecting rod, and bearings. If desired, a plain cylindrical bushing 74 may be placed between the wrist pin 64 and the connecting rod 73, as in the preceding embodiment.

The column portion 62 is desirably cored or bored hollow for lightness, and as an alternative may be threaded or otherwise formed for connection with the chuck for holding while being machined, as in the preceding embodiment.

An oil groove 68 is desirably formed in the skirt portion. In this instance, however, it is positioned near the free or lower edge portion thereof, rather than in a position corresponding with the location of the wrist pin. Holes 70 may be provided between said groove and the inner surface of the piston skirt, as in the preceding embodiment.

The outer part of the head member 52 is desirably beveled, as indicated at 69, to allow pressure from the outer portion of the cylinder adjacent the cylinder head, to force a flat flexible sealing ring or annular member 71 into tight sealing engagement with the ring means. The ring 71 is desirably formed of an alloy, such as stainless steel, copper, brass or the like, and conveniently tightly clamped between the head and skirt members of the piston when assembled, thereby gripping it in place so that it functions in a manner similar to that of the sealing member 31' of the preceding embodiment, as well as protecting the engaged wall of the ring groove against the battering action of the piston ring during the suction stroke, especially if said wall is formed of light metal or not as durable as iron or steel. A hole 72 is desirably provided in the skirt portion 53 to receive a spanner for tightening it against the head portion 52.

Although preferred embodiments of my invention have been disclosed, it will be understood that modifications may be made within the spirit and scope of the appended claims.

I claim:

1. A piston with a peripheral groove, an expanding piston ring in said groove, and a flat annuuar thin flexible metal sealing member disposed between that side of said ring which in operation is exposed to fluid pressure and the adjacent portion of said piston defining said groove, the inner peripheral edge of said sealing member being gripped in place with respect to said piston, said sealing member being so flexible that when subjected to such pressure the outer portion engages the adjacent surface of said ring over a substantial area and flexure takes place between the gripped and the outer portions.

2. A piston with a peripheral groove, an expanding piston ring in said groove, and a flat annular thin flexible metal sealing member disposed between that side of said ring which in operation is exposed to fluid pressure and the adjacent portion of said piston defining said groove, the inner peripheral edge of said sealing member extending beyond the bottom of said groove and gripped in place with respect to said piston, said sealing member being so flexible that when subjected to such pressure the outer portion engages the adjacent surface of said ring over a substantial area and flexure takes place between the gripped and the outer portions.

3. A piston comprising separable portions defining a peripheral groove, an expanding piston ring in said groove, and a flat annular thin flexible metal sealing member disposed between that side of said ring which in operation is exposed to fluid pressure and the adjacent portion of said piston defining said groove, the inner peripheral edge of said sealing member being gripped in place between said separable portions, said sealing member being so flexible that when subjected to such pressure flexure takes place between the gripped and the outer portions and the outer portion engages the adjacent surface of said ring over a substantial area.

4. A piston with a peripheral groove, a resiliently expansible piston ring in said groove, and a flat annular thin flexible sealing member disposed between that side of said ring which in operation is exposed to fluid pressure and the adjacent portion of said piston defining said groove, the inner peripheral edge of said sealing member being grippingly received in a correspondingly thin groove extending from the pressure side of said ring groove, said sealing member being so flexible that when subjected to said pressure flexure takes place between the gripped and the outer portions and the outer portion engages the adjacent surface of said ring over a substantial area.

5. A piston formed at least in part of light metal selected from the group consisting of aluminum, magnesium and light alloys, and having a peripheral groove, an expanding piston ring in said groove, and a flat annular thin flexible metal sealing member disposed between that side of said ring which in operation is exposed to fluid pressure and a light metal surface of said piston defining said groove, which light metal surface it overlies and forms a durable shield therefor directly engaged by said ring, the inner peripheral edge of said sealing member being gripped in place with respect to said piston, said sealing member being so flexible that when subjected to pressure during a power stroke the outer portion flexes with respect to the gripped portion and engages the adjacent surface of said ring over a substantial area.

CORNELIUS S. CLARK.